US011152674B2

(12) United States Patent
Hu et al.

(10) Patent No.: US 11,152,674 B2
(45) Date of Patent: Oct. 19, 2021

(54) BATTERY MODULE

(71) Applicant: Contemporary Amperex Technology Co., Limited, Ningde (CN)

(72) Inventors: Guoliang Hu, Ningde (CN); Chao Zeng, Ningde (CN); Shaozhen Chen, Ningde (CN); Quan Yang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/136,055

(22) Filed: Dec. 29, 2020

(65) Prior Publication Data

US 2021/0159575 A1 May 27, 2021

Related U.S. Application Data

(63) Continuation of application No. PCT/CN2019/094220, filed on Jul. 1, 2019.

(30) Foreign Application Priority Data

Apr. 30, 2019 (CN) .......................... 201920615149.9

(51) Int. Cl.
*H01M 50/581* (2021.01)
*H01M 50/209* (2021.01)
(Continued)

(52) U.S. Cl.
CPC ....... *H01M 50/581* (2021.01); *H01M 50/209* (2021.01); *H01M 50/317* (2021.01);
(Continued)

(58) Field of Classification Search
CPC ............. H01M 50/581; H01M 50/209; H01M 50/317; H01M 50/593
See application file for complete search history.

(56) References Cited

U.S. PATENT DOCUMENTS 5,396,177 A * 3/1995 Kuo ..................... H01M 6/5044
324/435
2004/0234842 A1 11/2004 Kawano et al.
(Continued)

FOREIGN PATENT DOCUMENTS

| CN | 107437635 A | 12/2017 |
| EP | 1492176 B1 | 9/2013 |
| JP | 4641744 B2 | 3/2011 |

OTHER PUBLICATIONS

PCT International Search Report for PCT/CN2019/094220, dated Feb. 5, 2020, 13 pages.

*Primary Examiner* — Olatunji A Godo
(74) *Attorney, Agent, or Firm* — Law Offices of Liaoteng Wang

(57) ABSTRACT

The present application relates to a battery module, which may include: a plurality of secondary batteries disposed in a row, the plurality of secondary batteries are provided with explosion-proof valves; an insulating plate disposed above the secondary batteries; a monitoring cable set connected with the insulating plate, and the monitoring cable set is corresponding to a position of each of the explosion-proof valves; the monitoring cable set comprises two monitoring cables, and the monitoring cables includes wires and thermomelting insulating layers cladding the wires; when the explosion-proof valve of any of the secondary batteries explodes, the thermomelting insulating layers of the two monitoring cables melt, and two wires are in contact with each other and short-circuited.

20 Claims, 7 Drawing Sheets

(51) Int. Cl.
*H01M 50/317* (2021.01)
*H01M 50/593* (2021.01)

(52) U.S. Cl.
CPC .... *H01M 50/593* (2021.01); *H01M 2200/103* (2013.01); *H01M 2200/20* (2013.01)

(56) References Cited

U.S. PATENT DOCUMENTS

| | | | | |
|---|---|---|---|---|
| 2005/0029867 | A1* | 2/2005 | Wood | H02J 1/08 307/10.1 |
| 2011/0020686 | A1* | 1/2011 | Yamamoto | H01M 10/647 429/120 |
| 2012/0045686 | A1* | 2/2012 | Jung | H01M 50/20 429/159 |
| 2012/0214027 | A1* | 8/2012 | Ahn | H01M 10/425 429/7 |

* cited by examiner

BATTERY MODULE

CROSS-REFERENCE TO RELATED APPLICATIONS

The present application is a continuation of International Application No. PCT/CN2019/094220, filed on Jul. 1, 2019, which claims priority to Chinese patent application No. 201920615149.9, entitled "BATTERY MODULE", filed on Apr. 30, 2019, both of which are incorporated herein by reference.

TECHNICAL FIELD

The present application relates to the field of battery technology, and in particular, to a battery module.

BACKGROUND

Currently, as the energy density in a secondary battery becomes higher and higher, the demand for battery safety in the market is increasingly high. Thermal runaway may occur during the use of the secondary battery; however, since the thermal runaway may not be detected in time, a high temperature environment may form locally, which is destructive. In severe cases, an upper cap of a battery box may be burned through, causing fires and serious safety incidents.

SUMMARY

Embodiments of the present application may provide a battery module, which may include:

a plurality of secondary batteries disposed in a row, the plurality of secondary batteries are provided with explosion-proof valves; an insulating plate disposed above the secondary batteries; a monitoring cable set connected with the insulating plate, and the monitoring cable set is corresponding to a position of each of the explosion-proof valves; the monitoring cable set includes two monitoring cables, and the monitoring cables includes wires and thermomelting insulating layers cladding the wires; when the explosion-proof valve of any of the secondary batteries explodes, the thermomelting insulating layers of the two monitoring cables melt, and two wires are in contact with each other and short-circuited.

According to one aspect of embodiments of the present application, the battery module may further include a current limiting unit connected in series between the two monitoring cables.

According to one aspect of embodiments of the present application, the current limiting unit is a resistor, and respective ends of the two wires are connected in series through the resistor.

According to one aspect of embodiments of the present application, the two monitoring cables are spirally wound with each other to form a twisted pair structure.

According to one aspect of embodiments of the present application, a number of the monitoring cable set is two or more.

According to one aspect of embodiments of the present application, the two wires are independent of each other and disconnected.

According to one aspect of embodiments of the present application, the insulating plate is provided with a receiving groove extending along an arrangement direction of the secondary batteries, the receiving groove is disposed correspondingly to positions of the explosion-proof valves, and the monitoring cable set is accommodated in the receiving groove.

According to one aspect of embodiments of the present application, a surface of the insulating plate facing the secondary batteries is provided with the receiving groove.

According to one aspect of embodiments of the present application, a surface of the insulating plate away from the secondary batteries is provided with the receiving groove.

According to one aspect of embodiments of the present application, the insulating plate is provided with a through hole communicating to the receiving groove, and the through hole is disposed correspondingly to the positions of the explosion-proof valves.

According to one aspect of embodiments of the present application, the thermomelting insulating layer is 0.1 mm to 1 mm in thickness.

According to one aspect of embodiments of the present application, the wire is 0.1 mm to 3 mm in diameter.

BRIEF DESCRIPTION OF THE DRAWINGS

Features, advantages, and technical effects of exemplary embodiments of the present application will be described below with reference to the drawings.

Figure 1:
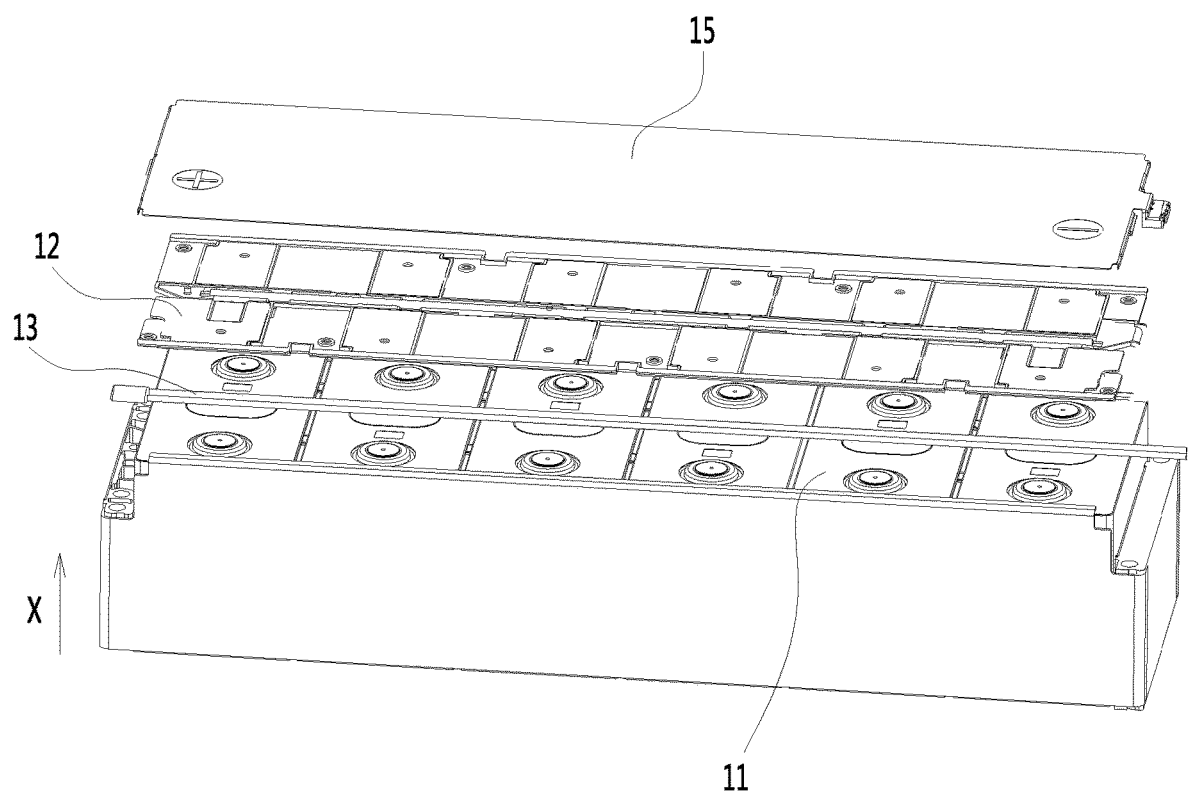
FIG. 1 is a breakdown structure diagram of a battery module according to one embodiment of the present application.
Figure 2:
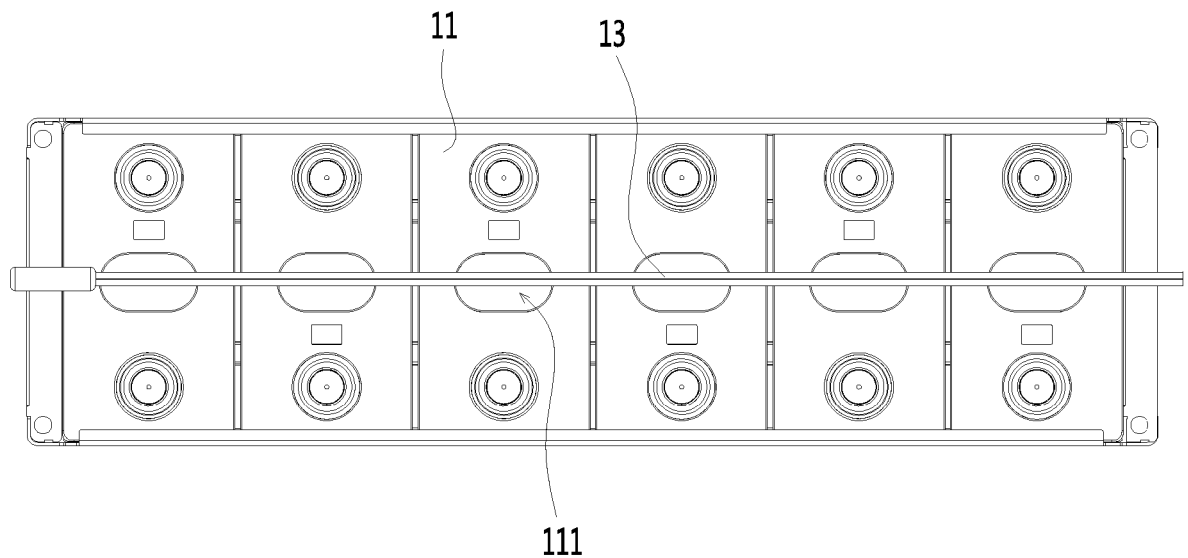
FIG. 2 is a partial structure diagram of a battery module according to one embodiment of the present application.

The drawings are not necessarily drawn to actual scale.

ILLUSTRATION FOR REFERENCE NUMERALS

1, a battery module;
11, a secondary battery; 111, an explosion-proof valve;
12, an insulating plate; 121, a receiving groove; 122, a through hole;
13, a monitoring cable set; 131, a monitoring cable; 131a, a wire; 131b, a thermomelting insulating layer;
14, a current limiting unit;
15, a top cap plate;
X, the height direction.

DETAILED DESCRIPTION

Implementation of the present application are described in further detail below with reference to the drawings and embodiments. The detailed description and drawings of the following embodiments are used to exemplarily illustrate the principle of the present application, but should not be used to limit the scope of the present application, that is, the present application is not limited to the described embodiments.

It should be noted that, in the description of the present application, unless otherwise specified, "plurality" means two or more; and the orientation or positional relationships indicated by terms "upper", "lower", "left", "right", "inner", "outside" and the like are only for the convenience of describing the present application and for simplifying the description, rather than indicating or implying that the referred device or element must in a specific orientation, be constructed and operated in a specific orientation, and therefore should not be understood as limitations to the present application. In addition, terms "first", "second" and the like are only used for the purposes of description and should not be understood as indicating or implying relative importance.

It should be further noted that, in the description of the present application, unless otherwise explicitly specified and defined, terms "install", "connect", and "couple" should be understood in a broad sense. For example, they may represent either a fixed connection or a detachable connection, or an integral connection; and they may represent a direct connection or an indirect connection through an intermediate medium. For those ordinarily skilled in the art, specific meanings of the above terms in the present application can be understood according to the specific contexts.

For a better understanding of the present application, embodiments of the present application will be described below with reference to FIG. 1 to FIG. 8.

Referring to FIG. 1, the battery module 1 according to embodiments of the present application may include a plurality of secondary batteries 11, an insulating plate 12, and a monitoring cable set 13. The plurality of secondary batteries 11 are disposed in a row along one direction to form a battery pack. Each of the secondary batteries 11 is provided with an explosion-proof valve 111. When the internal pressure of the secondary battery 11 exceeds a predetermined pressure value, the explosion-proof valve 111 may explode, accompanied with an ejection of high-temperature substances, such as high-temperature gas or high-temperature electrolyte. Also referring to FIG. 2, the insulating plate 12 is disposed above the secondary batteries 11 and cover the explosion-proof valve 111 of each of the secondary batteries 11. The monitoring cable set 13 is connected with the insulating plate 12. The monitoring cable set 13 is corresponding to the position of each of the explosion-proof valves 111. Along the height direction X, a projection of the monitoring cable set 13 falls on the explosion-proof valves 111. The monitoring cable set 13 includes two monitoring cables 131. The monitoring cables 131 includes wires 131a and thermomelting insulating layers 131b cladding the wires 131a. When the explosion-proof valve 111 of any of the secondary batteries 11 explodes, the thermomelting insulating layers 131b of the two monitoring cables 131 melt, and the two wires 131a are in contact with each other and short-circuited, so as to monitor the state of the secondary battery 11.

The battery module 1 according to embodiments of the present application may monitor the state of the secondary battery 11 in real-time by disposing the monitoring cable set 13. When the secondary battery 11 explodes, the thermomelting insulating layers 131b included respectively in the two monitoring cables 131 of the monitoring cable set 13 may melt and the exposed wires 131a may be short-circuited, so as to feed back a signal about the secondary battery 11 has exploded in time. Safety measures may be taken in time for the battery module 1 to prevent a spread of the high-temperature substances ejected from the secondary battery 11 in time, and the personnel may be warned at the same time. This is beneficial to reducing the possibility of thermal runaway of the secondary battery 11 and improve the safety during the use of the battery module 1.

In an embodiment, the battery module 1 may further include a Battery Management System (Battery Manage System, BMS). The two monitoring cables 131 in the monitoring cable set 13 are respectively connected with the positive terminal and the negative terminal of the battery management system. When the wires 131a included respectively in the two monitoring cables 131 are short-circuited with each other, the current flowing through the two wires 131a may increase. After monitoring a current change signal, the battery management system determines that the secondary battery 11 has exploded, and automatically intervenes in time or sends out an alarm signal.

In an embodiment, the number of the secondary batteries 11 may be 2 to 50. All of the secondary batteries 11 are combined in series or series-parallel through electrical connections.

In an embodiment, the material of the insulating plate 12 may be a polymer material such as polyamide, nylon, polycarbonate. The thickness of the insulating plate 12 is 0.5 mm to 3 mm, and the insulativity is greater than 500 MΩ (megohm). The monitoring cable set 13 and the insulating plate 12 may be connected by bonding, or the monitoring cable set 13 may be connected with the insulating plate 12 by a buckle.

In an embodiment, the material of the wire 131a may be aluminum or copper and the like. The diameter of the wire 131a may be 0.1 mm to 3 mm. If the diameter of the wire 131a is less than 0.1 mm, the wire 131a itself has a low performance to resist high temperature and shock, and may be easily fused by high-temperature substances or broken by external shocks, resulting in a failure of the wire 131a, and thus the function of the secondary battery 11 may not be monitored by means of the short circuit. If the diameter of the wire 131a is greater than 3 mm, the resistance of the wire 131a itself may be too large, which may reduce the monitoring sensitivity and precision, and the wire 131a with a diameter exceeding 3 mm may increase the installation space, thereby reducing the energy density of the battery module 1.

In an embodiment, the material of the thermomelting insulating layer 131b may be a polymer such as polyethylene, polypropylene, or polyester. The thickness of the thermomelting insulating layer 131b may be 0.1 mm to 1 mm. The insulativity of the thermomelting insulating layer 131b is greater than 500 MΩ (megohm). If the thickness of the thermomelting insulating layer 131b is less than 0.1 mm, the insulativity may be reduced, thereby increasing the possibility of a short circuit caused by a breakdown of the two wires 131a, and a false alarm may occur, thus the monitoring accuracy may be reduced. If the thickness of the thermomelting insulating layer 131b is greater than 1 mm, the difficulty of melting the thermomelting insulating layer 131b may increase, there may be a case that when the secondary battery 11 explodes, the thermomelting insulating layer 131b may not completely melt to expose the wire 131a, and in turn the two wires 131a may not be short-circuited, thus the monitoring cable set 13 may not be able to normally complete the monitoring work, and it may be unable to determine that the secondary battery 11 has exploded.

In an embodiment, the two wires 131a are independent of each other and disconnected. Each of the wires 131a has one end protruding from the insulating plate 12 and another end located between the insulating plate 12 and the secondary battery 11. The end of one of the wires 131a protruding from the insulating plate 12 may be connected with the positive terminal of the battery management system, while the end of the other wire 131a protruding from the insulating plate 12 may be connected with the negative terminal of the battery management system. The ends of the two wires 131a respectively located between the insulating plate 12 and the secondary battery 11 are in a free state, disconnected from each other and not electrically connected, thus the two wires 131a are in an open circuit state.

Figure 3:
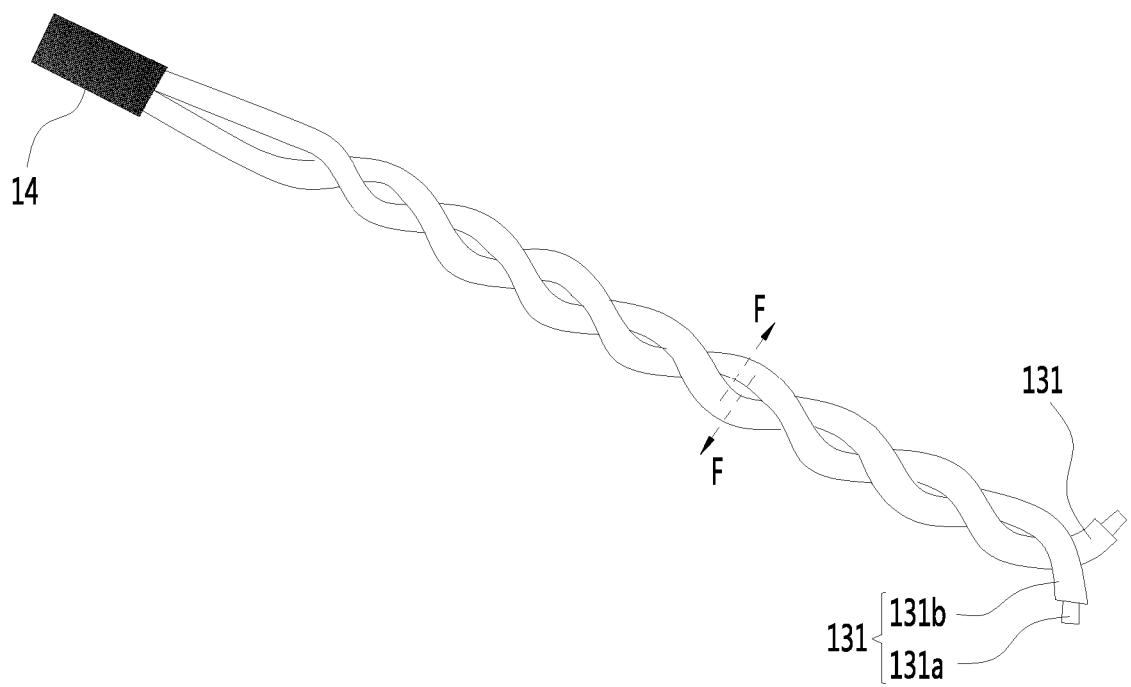
FIG. 3 is a structure diagram of monitoring cables according to one embodiment of the present application.
Figure 4:
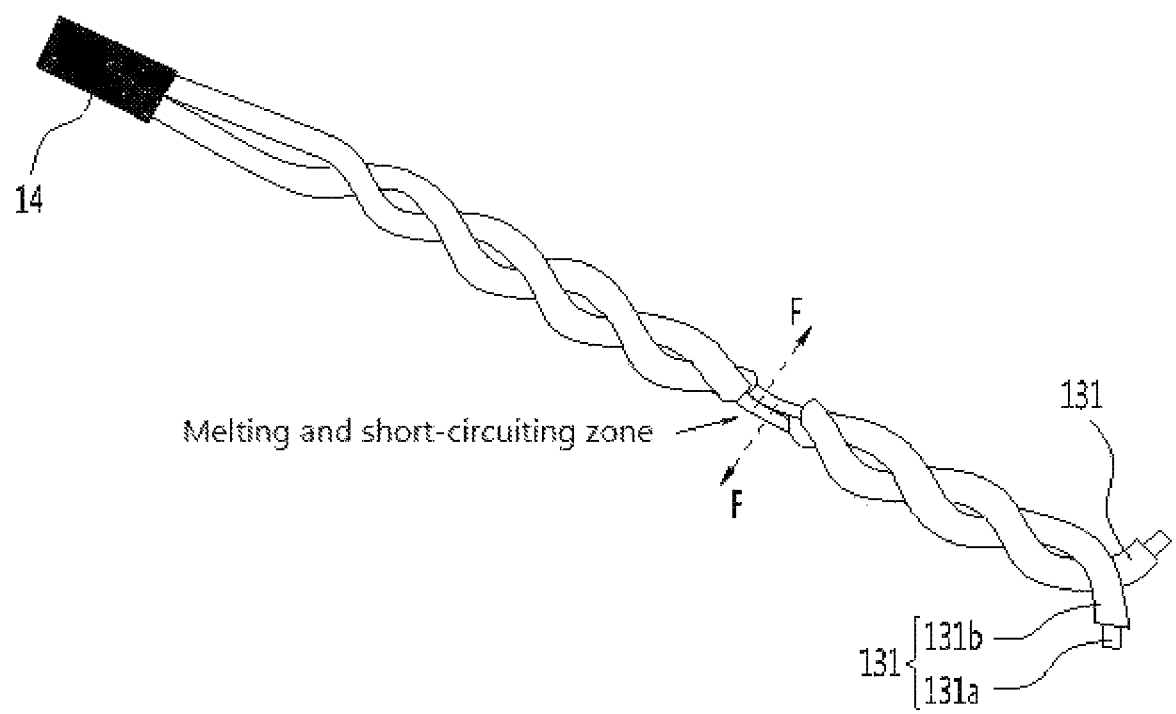
FIG. 4 is a diagram of a short-circuited state of wires of monitoring cables according to one embodiment of the present application.

In an embodiment, referring to FIG. 3 or FIG. 4, the battery module 1 may further include a current limiting unit 14. The current limiting unit 14 is connected in series between the two monitoring cables 131. The current limiting unit 14 may be able to limit the values of the currents passing respectively through the two monitoring cables 131, to ensure that the values of the currents passing respectively through the two monitoring cables 131 are much smaller than the values of the currents passing respectively through the two monitoring cables 131 when the two wires 131a are short-circuited. In this manner, when the two monitoring cables 131 work normally, the heat generated by themselves per unit time is small. At the same time, since the currents passing respectively through each of the two wires 131a when they are short-circuited may increase instantaneously, this is beneficial to detecting a current change signal by external devices, and improve the monitoring precision and sensitivity of the monitoring cables 131. In an embodiment, the current limiting unit 14 may be a resistor. The respective ends of the two wires 131a are connected in series through the resistor. The two wires 131a are disposed in a row. One end of each of the wires 131a is used for electrically connecting with external devices, and the other end is connected in series with the current limiting unit 14. Optionally, the resistance of the resistor may be 1 k$\Omega$ (kilohm) to 50 k$\Omega$ (kilohm).

In an example, each of the wires 131a has one end protruding from the insulating plate 12 and another end located between the insulating plate 12 and the secondary battery 11. The end of one of the wires 131a protruding from the insulating plate 12 may be connected with the positive terminal of the battery management system, while the end of the other wire 131a protruding from the insulating plate 12 may be connected with the negative terminal of the battery management system. The ends of the two wires respectively located between the insulating plate 12 and the secondary battery 11 are electrically connected by the current limiting unit 14.

In an embodiment, the two monitoring cables 131 are disposed in a row. In another embodiment, referring to FIG. 3 or FIG. 4, the two monitoring cables 131 are spirally wound with each other to form a twisted pair structure. There is stress between the two monitoring cables 131 themselves, so that the two monitoring cables 131 tend to approach each other. After the secondary battery 11 explodes such that the respective thermomelting insulating layers 131b of the two monitoring cables 131 melt, the respective wires 131a of the two monitoring cables 131 may move toward each other under the action of the stress until they are in contact and short-circuited. In this manner, in the embodiment in which the two monitoring cables 131 form the twisted pair structure, since the two monitoring cables 131 themselves have pre-stress, the two wires 131a may automatically approach each other after the thermomelting insulating layers 131b melt. This may reduce the possibility that the two wires 131a do not come into contact, and at the same time, shorten the time for feeding back that the two wires 131a are in contact and short-circuited, and improve the monitoring precision and the instantaneity of the feedback.

The number of the monitoring cable set 13 in this embodiment may be two or more. The two or more monitoring cable sets 13 are disposed in a row along one direction, and are all disposed correspondingly to the positions of the explosion-proof valves 111. When the secondary battery 11 explodes, any of the two or more monitoring cable sets 13 may be able to monitor the state of the secondary battery 11. The two or more monitoring cable sets 13 are mutually redundant, which is beneficial to improving the monitoring accuracy. When one of the two or more monitoring cable sets 13 fails or works abnormally, the remaining of the monitoring cable sets 13 may be able to normally complete the monitoring work, thereby reducing the possibility of false negatives.

Figure 5:
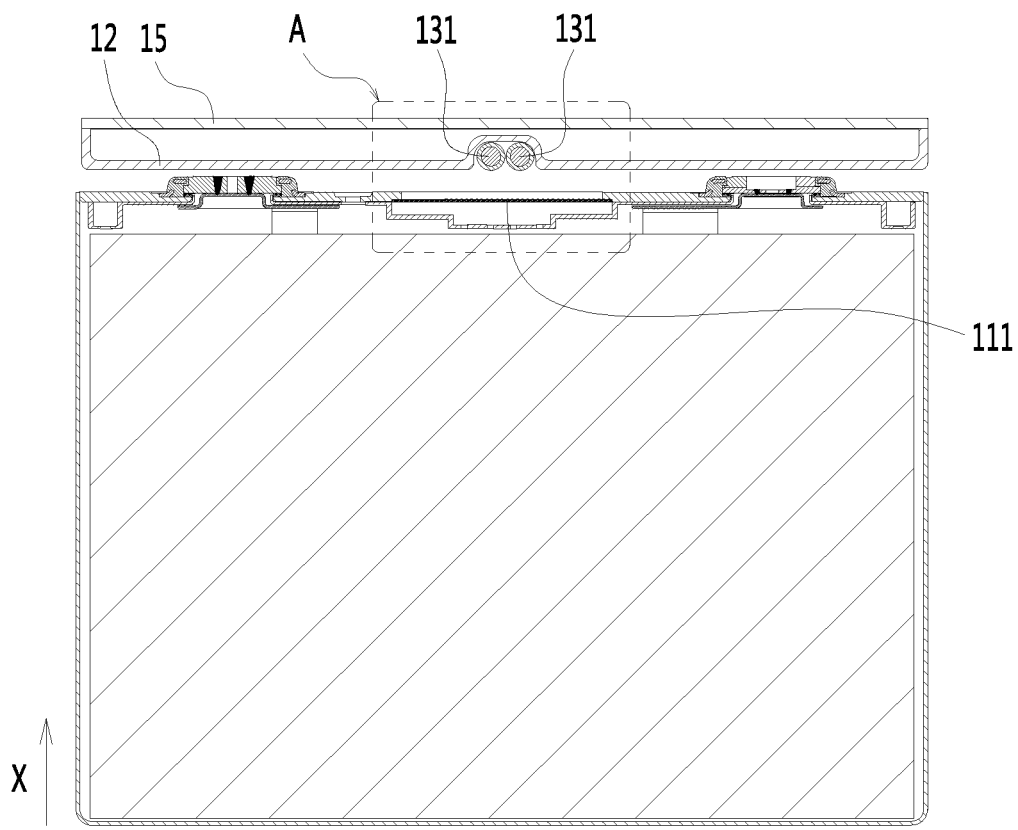
FIG. 5 is a cross-sectional structure diagram of a secondary battery according to one embodiment of the present application.
Figure 6:
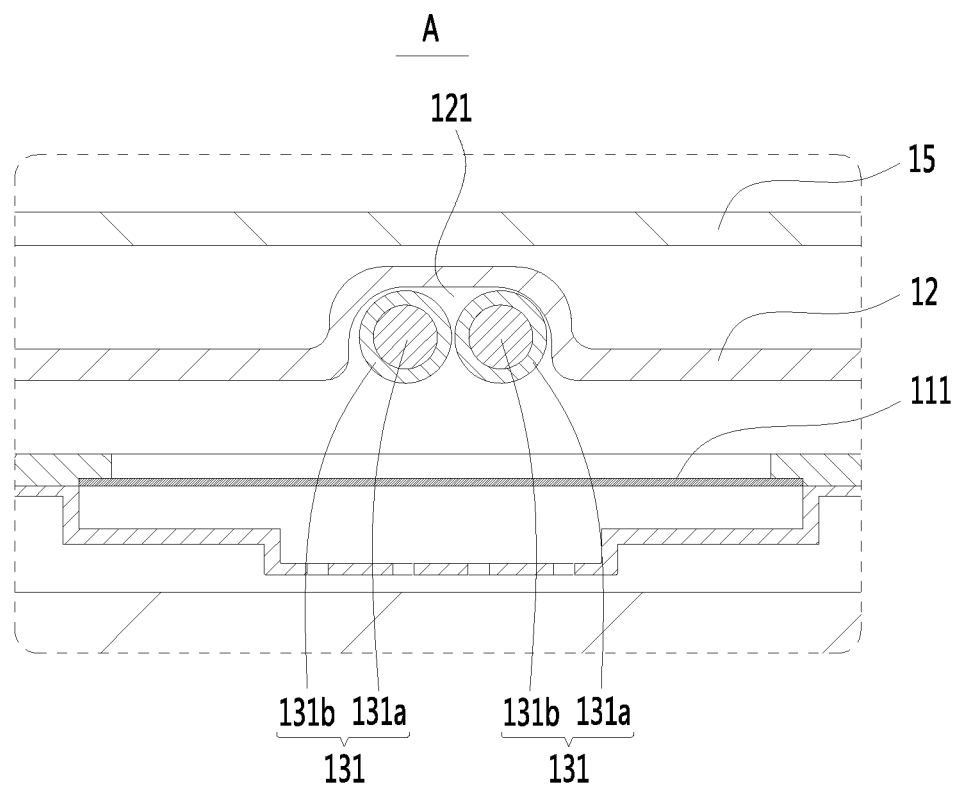
FIG. 6 is an enlarged diagram of A in FIG. 5.

Referring to FIG. 5 and FIG. 6, the insulating plate 12 in this embodiment is provided with a receiving groove 121 extending along an arrangement direction of the secondary batteries 11. The receiving groove 121 is disposed correspondingly to the positions of the explosion-proof valves 111. The monitoring cable set 13 is accommodated in the receiving groove 121, so that on the one hand, this is beneficial to improving the structure compactness, save space, and increase the energy density of the battery module 1, and on the other hand, the monitoring cable set 13 is constrained by the insulating plate 12, which may improve the stability of the position of the monitoring cable set 13, and reduce the possibility that the monitoring cable set 13 shifts and is not able to keep corresponding to the positions of the explosion-proof valves 111.

In an embodiment, referring to FIG. 6, the surface of the insulating plate 12 facing the secondary batteries 11 is provided with the receiving groove 121. The receiving groove 121 has an opening facing the explosion-proof valves 111. The monitoring cable set 13 directly corresponds to the explosion-proof valves 111 of the secondary batteries 11. When the secondary battery 11 explodes, the internal high-temperature substances may directly act on the monitoring cable set 13, and quickly melt the thermomelting insulating layers 131b, and then the two wires 131a are in contact and short-circuited, which is beneficial to shortening the monitoring time.

Figure 7:
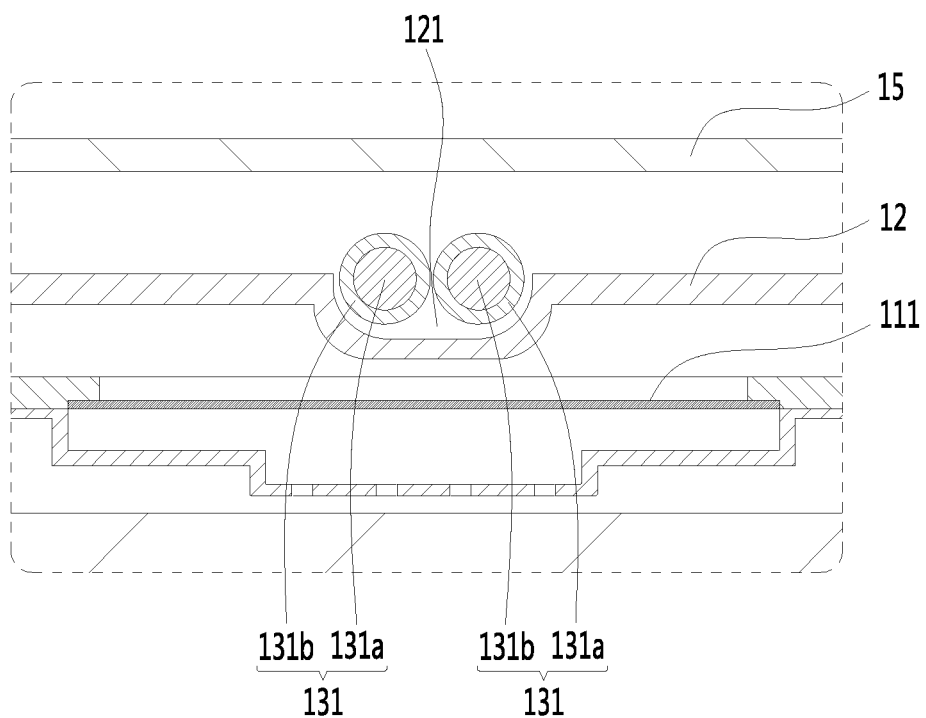
FIG. 7 is a partial cross-sectional structure diagram of a secondary battery according to another embodiment of the present application.
Figure 8:
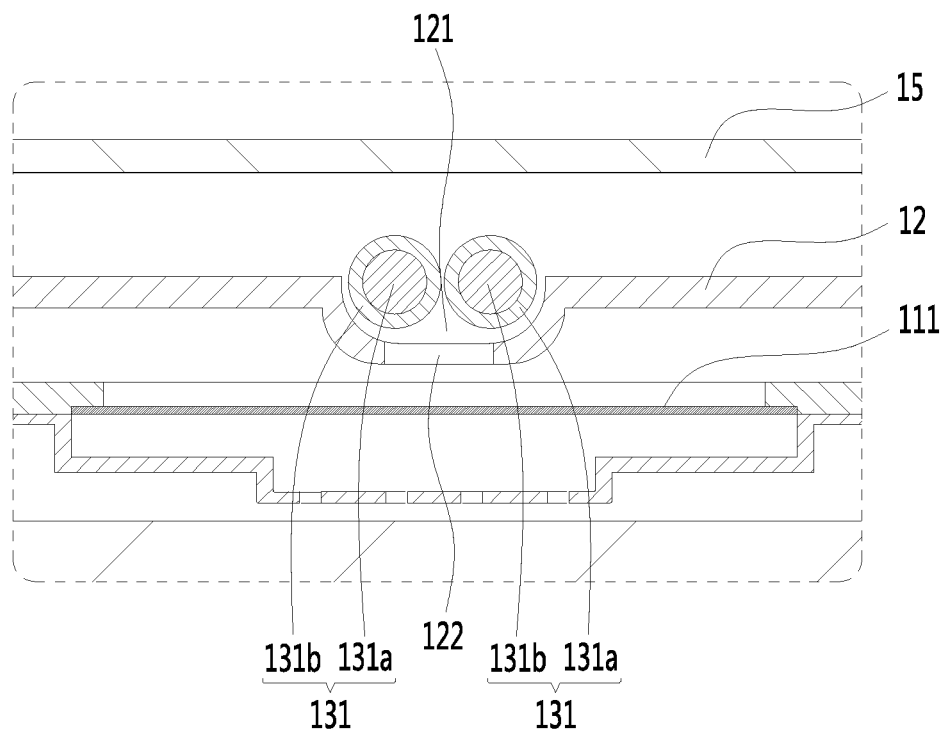
FIG. 8 is a partial cross-sectional structure diagram of a secondary battery according to yet another embodiment of the present application.

In an embodiment, referring to FIG. 7, the surface of the insulating plate 12 away from the secondary batteries 11 is provided with the receiving groove 121. The insulating plate 12 is able to provide a supporting strength for the monitoring cable set 13 along the height direction X. When the battery module 1 vibrates in use, the monitoring cable set 13 is not prone to escape from the receiving groove 121. The insulating plate 12 in this embodiment may melt itself under the action of high temperature. When the secondary battery 11 explodes, the insulating plate 12 is first melted, and then the thermomelting insulating layers 131b of the monitoring cables 131 are melted. In an example, the receiving groove 121 extends along a straight line to form a strip-shaped groove. The monitoring cable set 13 also has a strip-shaped structure as a whole.

In an embodiment, referring to FIG. 7, the bottom of the receiving groove 121 is an enclosed structure. In another embodiment, referring to FIG. 8, the insulating plate 12 is provided with a through hole 122. The through hole 122 communicates to the receiving groove 121. The through hole 122 is disposed correspondingly to the positions of the explosion-proof valves 111. When the secondary battery 11 explodes, a part of the high-temperature substances may preferentially pass through the through hole 122 and directly act on the monitoring cable set 13, which is beneficial to shortening a delay time of the melting of the thermomelting insulating layers 131b and improve the monitoring sensitivity. In an example, the number of the through hole 122 is one. A ratio of the extension length of the through hole 122 to the extension length of the receiving groove 121 is 0.7 to 0.9. In another example, the number of the through hole 122 is two or more. The two or more through holes 122 are disposed at intervals along the extending direction of the receiving groove 121.

In an embodiment, the insulating plate 12 may have lightening holes disposed thereon, which is beneficial to increasing the energy density of the battery module 1.

The insulating plate 12 in this embodiment may be used as a wiring harness isolating plate. The cables arranged inside the battery module 1 may be disposed on the insulating plate 12, so as to be insulated and isolated from the secondary battery 11 to improve the safety during the use of the battery module 1.

The battery module in this embodiment may further include a top cap plate 15. The top cap plate 15 is disposed on a side of the insulating plate 12 away from the secondary batteries 11. The top cap plate 15 may protect the monitoring cable set 13. The top cap plate 15 may block the high-temperature substances from diffusing outward, and improve the safety of the battery module.

The battery module 1 according to embodiments of the present application may monitor the state of the secondary battery 11 in real-time by disposing the monitoring cable set 13. When the secondary battery 11 explodes and ejects high-temperature substances, the thermomelting insulating layers 131b included respectively in the two monitoring cables 131 of the monitoring cable set 13 may melt and the exposed two wires 131a may be short-circuited, so as to feed back a signal about the secondary battery 11 has exploded in time. Safety measures may be taken in time for the battery module 1 to prevent a spread of the high-temperature substances ejected from the secondary battery 11 in time, and the safety during the use of the battery module 1 is improved.

Although the present application has been described with reference to preferred embodiments, various modifications may be made thereto and components thereof may be replaced with their equivalents, without departing from the scope of the present application. In particular, as long as there is no structural conflict, various technical features mentioned in various embodiments can be combined in any manner. The present application is not limited to the specific embodiments disclosed herein, and instead, includes all the technical solutions that fall within the scope of the claims.

What is claimed is:

1. A battery module, comprising:
a plurality of secondary batteries disposed in a row and provided with explosion-proof valves;
an insulating plate disposed above the secondary batteries;
a monitoring cable set connected with the insulating plate; and
a battery management system,
wherein the monitoring cable set is corresponding to a position of each of the explosion-proof valves;
the monitoring cable set comprises two monitoring cables respectively connected with a positive terminal and a negative terminal of the battery management system;
each of the two monitoring cables comprises a wire and a thermomelting insulating layer cladding the wire;
when the explosion-proof valve of any of the secondary batteries explodes, the thermomelting insulating layers of the two monitoring cables melt, and two wires respectively in the two monitoring cables are in contact with each other and short-circuited; and
wherein the battery management system is configured to take safety measures when monitoring a current change signal due to a short circuit of the two wires.

2. The battery module according to claim 1, wherein the battery module further comprises a current limiting unit connected in series between the two monitoring cables.

3. The battery module according to claim 2, wherein the current limiting unit is a resistor, and respective ends of the two wires are connected in series through the resistor.

4. The battery module according to claim 1, wherein the two monitoring cables are spirally wound with each other to form a twisted pair structure.

5. The battery module according to claim 1, wherein a number of the monitoring cable set is two or more.

6. The battery module according to claim 1, wherein the two wires are independent of each other and disconnected.

7. The battery module according to claim 1, wherein the insulating plate is provided with a receiving groove extending along an arrangement direction of the secondary batteries, the receiving groove is disposed correspondingly to positions of the explosion-proof valves, and the monitoring cable set is accommodated in the receiving groove.

8. The battery module according to claim 7, wherein a surface of the insulating plate facing the secondary batteries is provided with the receiving groove.

9. The battery module according to claim 7, wherein a surface of the insulating plate away from the secondary batteries is provided with the receiving groove.

10. The battery module according to claim 7, wherein the insulating plate is provided with a through hole communicating to the receiving groove, and the through hole is disposed correspondingly to the positions of the explosion-proof valves.

11. The battery module according to claim 1, wherein the thermomelting insulating layer is 0.1 mm to 1 mm in thickness.

12. The battery module according to claim 1, wherein the wire is 0.1 mm to 3 mm in diameter.

13. A battery pack comprising the battery module according to claim 1.

14. The battery pack according to claim 13, wherein the battery module further comprises a current limiting unit connected in series between the two monitoring cables.

15. The battery pack according to claim 14, wherein the current limiting unit is a resistor, and respective ends of the two wires are connected in series through the resistor.

16. The battery pack according to claim 13, wherein the two monitoring cables are spirally wound with each other to form a twisted pair structure.

17. The battery pack according to claim 13, wherein a number of the monitoring cable set is two or more.

18. The battery pack according to claim 13, wherein the two wires are independent of each other and disconnected.

19. The battery pack according to claim 13, wherein the insulating plate is provided with a receiving groove extending along an arrangement direction of the secondary batteries, the receiving groove is disposed correspondingly to positions of the explosion-proof valves, and the monitoring cable set is accommodated in the receiving groove.

20. The battery pack according to claim 19, wherein a surface of the insulating plate facing the secondary batteries is provided with the receiving groove.

\* \* \* \* \*